United States Patent
Vänttinen (10) Patent No.: US 7,068,634 B2
(45) Date of Patent: Jun. 27, 2006

(54) DATA TRANSMISSION IN PACKET-SWITCHED RADIO SYSTEM IMPLEMENTING USER EQUIPMENT LOCATION SERVICE

(75) Inventor: Veijo Vänttinen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 853 days.

(21) Appl. No.: 09/862,906

(22) Filed: May 22, 2001

(65) Prior Publication Data

US 2002/0027993 A1    Mar. 7, 2002

(30) Foreign Application Priority Data

May 22, 2000    (FI)    ................................ 20001223

(51) Int. Cl.
*H04J 3/24*    (2006.01)
*H04Q 7/20*    (2006.01)

(52) U.S. Cl. .................. 370/338; 370/349; 370/401; 370/466; 370/469; 455/445; 455/456.1

(58) Field of Classification Search ............... 370/466, 370/467, 474, 342, 338, 349, 401, 469; 709/230, 709/238; 342/357.03, 450; 455/456, 456.1, 455/456.2, 456.3, 456.4, 456.5, 445
See application file for complete search history.

(56) References Cited

U.S. PATENT DOCUMENTS

| | | | | |
|---|---|---|---|---|
| 6,104,931 A | | 8/2000 | Havinis et al. ............. 455/456 |
| 6,104,932 A | * | 8/2000 | Havinis .................... 455/456.5 |
| 6,198,935 B1 | * | 3/2001 | Saha et al. ................ 455/456.2 |
| 6,295,454 B1 | * | 9/2001 | Havinis et al. ........... 455/456.3 |
| 6,311,069 B1 | * | 10/2001 | Havinis et al. ........... 455/456.4 |
| 6,313,787 B1 | * | 11/2001 | King et al. .............. 342/357.03 |
| 6,490,451 B1 | * | 12/2002 | Denman et al. ............. 455/436 |

(Continued)

FOREIGN PATENT DOCUMENTS

EP    0917385 A1    5/1999

(Continued)

OTHER PUBLICATIONS

"3$^{rd}$ Generation Partnership Project; Technical Specification Group Services and System Aspects; Functional Stage 2 Description of Location Services in UMTS, (Release 1999)", 3G TS 23.171 V3.0.0.

*Primary Examiner*—Alpus H. Hsu
(74) *Attorney, Agent, or Firm*—Perman & Green, LLP (57) ABSTRACT

The invention relates to method and system for transmitting data between user equipment and serving mobile location center in packet-switched-radio system implementing user equipment location service. The method comprises: (302) data to be transmitted is placed in a message of a third-layer radio resource protocol; (304) the radio resource protocol message is transmitted to the radio network using a logical link control protocol set on the second layer of the packet protocol stack; (306) a logical link control protocol relay set on the second layer of the packet protocol stack in the radio network directs the logical link protocol message to a second party; (308) the second-layer logical link control protocol residing in the second party transmits the radio resource protocol message to the radio resource protocol set on the third layer; (310) the second party disassembles the transmitted data from the radio resource protocol message.

18 Claims, 6 Drawing Sheets

U.S. PATENT DOCUMENTS

| | | | |
|---|---|---|---|
| 6,516,197 B1* | 2/2003 | Havinis et al. | 455/456.1 |
| 6,539,237 B1* | 3/2003 | Sayers et al. | 455/555 |
| 6,606,501 B1* | 8/2003 | Saha et al. | 342/450 |
| 6,791,963 B1* | 9/2004 | Hwang et al. | 370/342 |
| 6,826,406 B1* | 11/2004 | Vialen et al. | 455/450 |
| 2002/0086682 A1* | 7/2002 | Naghian | 455/456 |

FOREIGN PATENT DOCUMENTS

| | | |
|---|---|---|
| EP | 1056306 A1 | 11/2000 |
| WO | WO 99/55114 | 10/1999 |
| WO | WO 00/25545 | 5/2000 |
| WO | WO 00/35228 | 6/2000 |
| WO | WO 00/35236 | 6/2000 |

* cited by examiner

DATA TRANSMISSION IN PACKET-SWITCHED RADIO SYSTEM IMPLEMENTING USER EQUIPMENT LOCATION SERVICE

FIELD

The invention relates to a method for transmitting data in a packet-switched radio system implementing a user equipment location service, and to a packet-switched radio system implementing a user equipment location service.

BACKGROUND

Locating user equipment, i.e. defining the geographical location of user equipment, is an important function in cellular networks. In the United States, the Federal Communications Commission FCC requires that it must be possible to locate all user equipment making an emergency call to an accuracy of 50 meters. Location can also be utilized for commercial purposes, for instance for defining different tariff areas or for implementing a navigation service instructing a user. A location service (LCS) has until now been developed mainly for application to circuit-switched cellular networks, for instance the GSM system (Global System for Mobile Communications).

Different methods are used in implementing a location service. On the roughest level, the location of user equipment can be positioned on the basis of the identity of the cell serving the user equipment. This information is not very exact, since the diameter of a cell can be tens of kilometers.

A more accurate result is obtained by using as additional information the timing information of a radio link, for instance the timing advance (TA). In the GSM system, TA shows the location of the user equipment at an accuracy of approximately 550 meters. The problem is that if the cell in implemented by an omnidirectional antenna, the location of the user equipment is only known in relation to a base station on a circle drawn around it. A base station divided into three sectors, for instance, improves the situation somewhat, but even then, the location of the user equipment can only be positions to a 120-degree sector, in an area 550 meters deep, at a certain distance from the base station.

Even these inexact methods are enough for some applications, for instance for defining tariff areas. More accurate methods have also been developed. These methods are usually based on several different base stations taking measurements from a signal transmitted by the user equipment, the TOA method (Time of Arrival) is an example of these.

The user equipment, too, can take measurements from signals transmitted by several different base stations, one example of such a method is the E-OTD (Enhanced Observed Time Difference) method. In synchronized networks, the user equipment measures the inter-relations of the reception time-instances of signals received from different base stations. In non-synchronized networks, a location measurement unit (LMU) at a fixed, known measurement point also receives the signals transmitted by the base stations. The location of the user equipment is defined on the basis of geometrical components obtained from time delays.

Another location method is using a GPS (Global Positioning System) receiver in the user equipment. A GPS receiver receives a signal transmitted by at least four earth-orbiting satellites, on the basis of which it is possible to calculate the latitude, longitude and height of the location of the user equipment. The user equipment can position itself or it can be assisted in the positioning. The network part of the radio system can transmit an assisting message to the user equipment to speed up the positioning, i.e. the power consumption of the user equipment is reduced. The assisting message can contain the time, a list of visible satellites, a Doppler phase of a satellite signal and a search window of a code phase. The user equipment can transmit the received information to the network part which then calculates the location. The network part of the radio system refers herein to the fixed part of the radio system, i.e. the entire system excluding the user equipment.

So far, not very much attention has been paid to implementing a location service to packet-switched radio systems, such as GPRS (General Packet Radio Service) or EGPRS (Enhanced General Packet Radio Service). EGPRS is a GSM-based system utilizing packet-switched transmission. EGPRS uses EDGE (Enhanced Data Rates for GSM Evolution) technology to increase data transmission capacity. In addition to the GMSK (Gaussian Minimum-Shift Keying) modulation used normally in GSM, it is possible to use 8-PSK (8-Phase Shift Keying) modulation for packet data channels. The aim is mainly to implement non-real-time data transmission services, such as copying a file and using an Internet browser, but packet-switched real-time services for speech and video transmission can also be implemented.

Two different solutions have been defined for a location service in the GSM specifications: a base station system oriented solution and a network subsystem oriented solution. In the first solution, a serving mobile location center SMLC is connected to the base station controller, and in the second solution, to the mobile switching center. The UMTS specifications only define one solution: a radio network oriented solution. The GPRS specifications also define at least the radio network oriented solution.

Some of the above-mentioned location methods require communication between user equipment and the location center. In the GSM system, this communication is done using a third-layer radio resource location services protocol (RRLP).

In GPRS, the third-layer protocols only reside in the user equipment and core network, for instance in the support node SGSN, i.e. a radio network does not have third-layer protocols. It is, however, necessary to transmit RRLP-type information between the user equipment and the location center in the radio network. On the second layer, GPRS has a logical link control protocol which provides services for third-layer protocols.

Using location methods thus usually requires data transmission between the user equipment and the location center residing in the network part of the radio system. In circuit-switched radio systems, data transmission is implemented using the services of the third layer of the protocol stack. This is, however, not possible in packet-switched radio systems, because the serving mobile location center is in the radio network of the radio system, but the required third layers are in the core network of the radio system.

BRIEF DESCRIPTION OF THE INVENTION

It is an object of the invention to provide an improved method for transmitting data in a packet-switched radio system implementing a user equipment location service, and an improved packet-switched radio system implementing a user equipment location service. One aspect of the invention is the method described in claim 1 for, transmitting data in a packet-switched radio system implementing a user equipment location service. Another aspect of the invention is the packet-switched radio system implementing a user equipment location service, which is described in claim 10. Preferred embodiments of the invention are described in the dependent claims.

The invention is based on developing a general-purpose solution, using which it is possible to transmit third-layer messages between user equipment and a serving mobile location center in a packet-switched radio system implementing a location service.

The method and apparatus of the invention provide several improvements. A radio network oriented solution becomes possible in GPRS. Communication between the user equipment and the serving mobile location center becomes possible. The solution re-uses existing solutions, i.e. it can be implemented efficiently. The traffic load of the support node does not increase, because the traffic coming from the user equipment is routed directly from the radio network to the serving mobile location center, and correspondingly, the traffic coming from the serving mobile location center is routed directly from the radio network to the user equipment. Existing GPRS systems can be updated with minimal changes to the system specifications to implement the location service.

BRIEF DESCRIPTION OF THE FIGURES

In the following, the invention will be described in greater detail by means of preferred embodiments and with reference to the attached drawings in which.

DESCRIPTION OF EMBODIMENTS

A typical structure of a packet-switched radio system and its interfaces to a public switched telephone network and a packet transmission network are described with reference to FIGS. 1A and 1B. FIG. 1B only shows the blocks essential to explaining the embodiments, but it is clear to a person skilled in the art that a conventional packet-switched cellular network also contains other functions and structures which need not be described in greater detail herein. The radio system can, for instance, be a GSM-based GPRS or EGPRS, a universal telecommunications system UMTS employing wideband code division multiple access, or an intermediate form of these systems, in which the structure of the radio network is outlined as in UMTS and the radio network is called GERAN (GSM Enhanced Radio Access Network), for instance, but in which the radio interface is, however, a GSM-based normal radio interface or a radio interface using EDGE modulation.

Figure 1A:
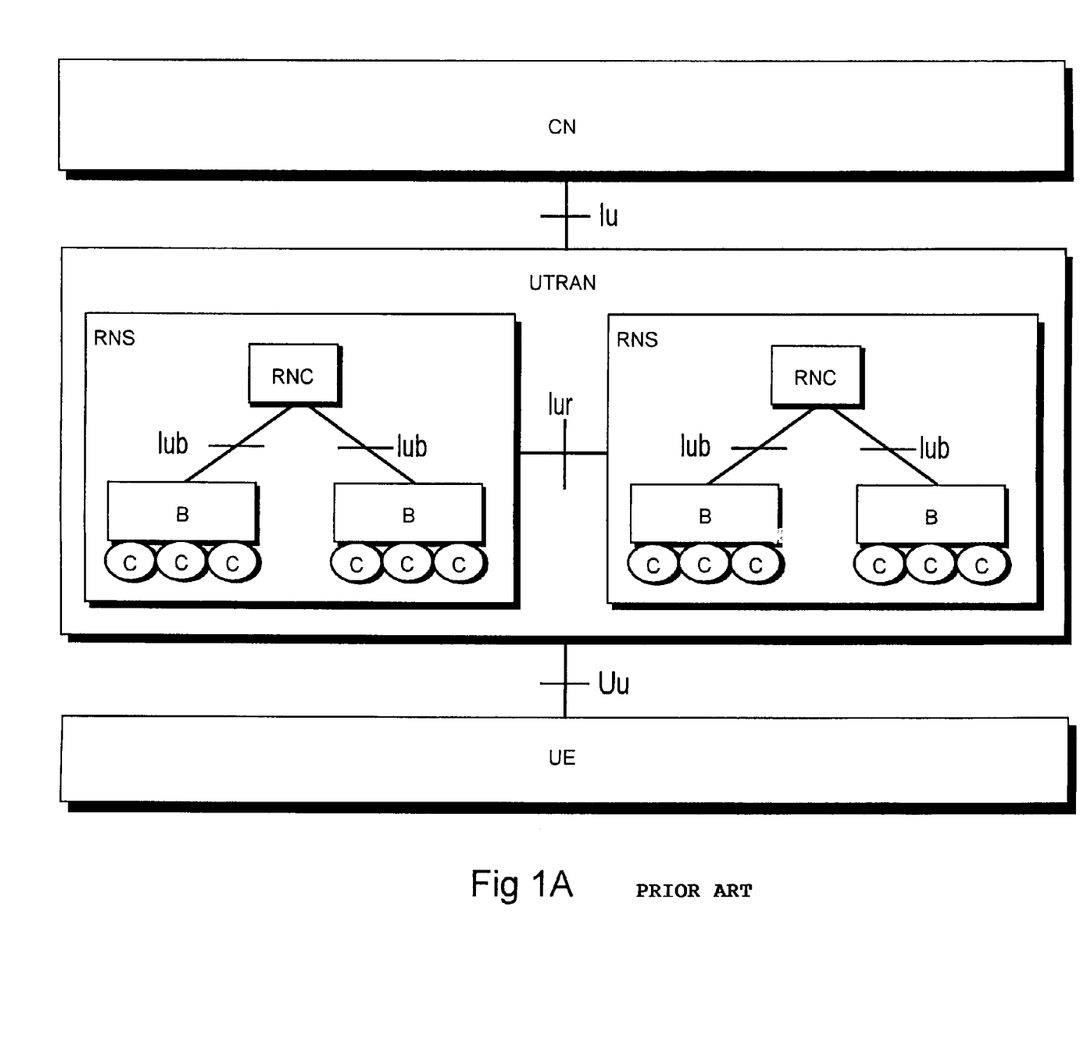
FIG. 1A shows an example of the structure of a cellular network.
Figure 1B:
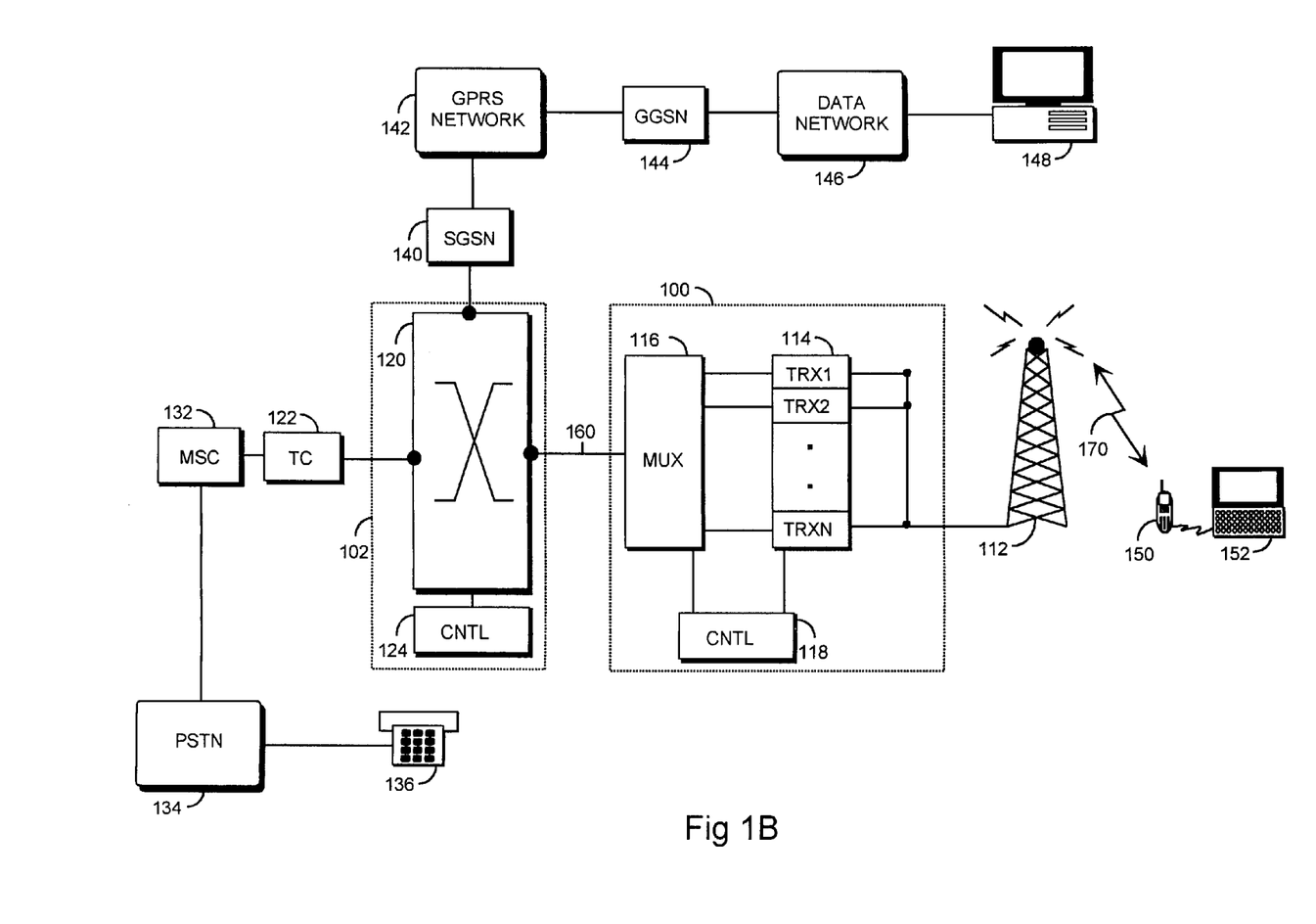
FIG. 1B shows the cellular network in greater detail in a block diagram.

The description of FIGS. 1A and 1B is mainly based on UMTS. The main parts of the mobile system are a core network CN, a UMTS terrestrial radio access network, or radio network UTRAN in short, and user equipment UE. The interface between CN and UTRAN is called Uu, and the air interface between UTRAN and UE is called Uu.

UTRAN is made up of radio network subsystems RNS. The interface between RNSs is called Iur. RNS is made up of a radio network controller RNC and one or more nodes B. The interface between RNC and B is called Iub. The coverage area, i.e. cell, of a node B is marked C in FIG. 1B. RNS can also be called by its more traditional name, base station system (BSS). The network part of the radio system thus comprises a radio network UTRAN and a core network CN.

The description in FIG. 1A is very abstract so it is clarified in FIG. 1B by indicating approximately which part of the GSM system corresponds to which part in UMTS. It should be noted that the presented description is in no way binding but for the purpose of illustration, since the responsibilities and functions of the different parts of UMTS are still being designed.

User equipment 150 can, for instance, be fixed, installed in a vehicle, or portable. The user equipment 150 is also known as a mobile station MS. The infrastructure of the radio network UTRAN is made up of radio network subsystems RNS, i.e. base station systems. A radio network subsystem RNS is made up of a radio network controller RNC, i.e. base station controller, 102 and at least one node B, i.e. base station, 100 controlled by it.

The base station B has a multiplexer 116, transceivers 114 and a control unit 118 which controls the operation of the transceivers 114 and the multiplexer 116. Traffic and control channels used by the transceivers 114 are placed on the transmission link 160 by the multiplexer 116.

The transceivers 114 of the base station B are connected to an antenna unit 112 which implements a bi-directional radio link Uu to the user equipment 150. The structure of frames transmitted in the bi-directional radio link Uu is exactly defined.

The radio network controller RNC comprises a group switching field 120 and control unit 124. The group switching field 120 is used for speech and data connection and to connect signaling circuits. The base station system formed by the base station B and the radio network controller RNC also comprises a transcoder 122. Work distribution between the radio network controller RNC and the base station B as well as their physical structure can vary depending on implementation. Typically, the base station B takes care of the radio path implementation as described above. The radio network controller RNC typically takes care of the following: management of radio resources, control of handover between cells, power adjustment, timing and synchronization, paging user equipment.

The transcoder 122 is usually located as close as possible to a mobile switching center 132, because speech can then be transmitted in mobile telephone system format between the transcoder 122 and the radio network controller RNC, saving transmission capacity. The transcoder 122 converts the different digital coding formats of speech used between the public switched telephone network and the mobile network to be compatible with each other, for instance from the 64 kbit/s format of a public network to another (e.g. 13 kbit/s) format of a cellular network and vice versa. The hardware required is not described in detail herein, but it can be noted that other data than speech is not converted in the transcoder 122. The control unit 124 takes care of call control, mobility management, collection of statistics, and signaling.

The core network CN comprises an infrastructure belonging to a mobile telephone system and external to UTRAN. Of the apparatuses belonging to the circuit-switched transmission of the core network CN, FIG. 1B shows the mobile switching center 132.

As shown in FIG. 1B, connections (shown as black dots) can be made with the switching field 120 to both a public switched telephone network 134 through the mobile switching center 132 and to a packet-switched network 142. A typical terminal 136 in the public switched telephone network is a conventional phone or an ISDN (Integrated Services Digital Network) phone. Packet transmission is performed from a computer 148 connecting to the mobile system through the Internet 146 to a portable computer 152 connected to the user equipment 150. Instead of a combination of the user equipment 150 and portable computer 152, a WAP (Wireless Application Protocol) phone can be used.

The connection between the packet transmission network 142 and the switching field 120 is established by a serving GPRS support node (SGSN) 140. The task of the support node 140 is to transmit packets between the base station system and a gateway GPRS support node (GGSN) 144, and to record the location of the user equipment 150 in its area.

The gateway support node 144 connects the public packet transmission network 146 and the packet transmission network 142. An Internet protocol or an X.25 protocol can be used in the interface. The gateway support node 144 hides by encapsulation the internal structure of the packet transmission network 142 from the public packet transmission network 146 so that to the public packet transmission network 146, the packet transmission network 142 seems like a sub-network and the public packet transmission network 146 can address packets to and receive packets from the user equipment 150 in it.

The packet transmission network 142 is typically a private network that uses an Internet protocol and transfers signaling and user data. Depending on the operator, the structure of the network 142 may vary in its architecture and protocols below the Internet protocol layer.

The public packet transmission network 146 can be the Internet, for instance, and a terminal 148, such as a server, connected to it wants to transmit packets to user equipment 150.

Figure 1C:
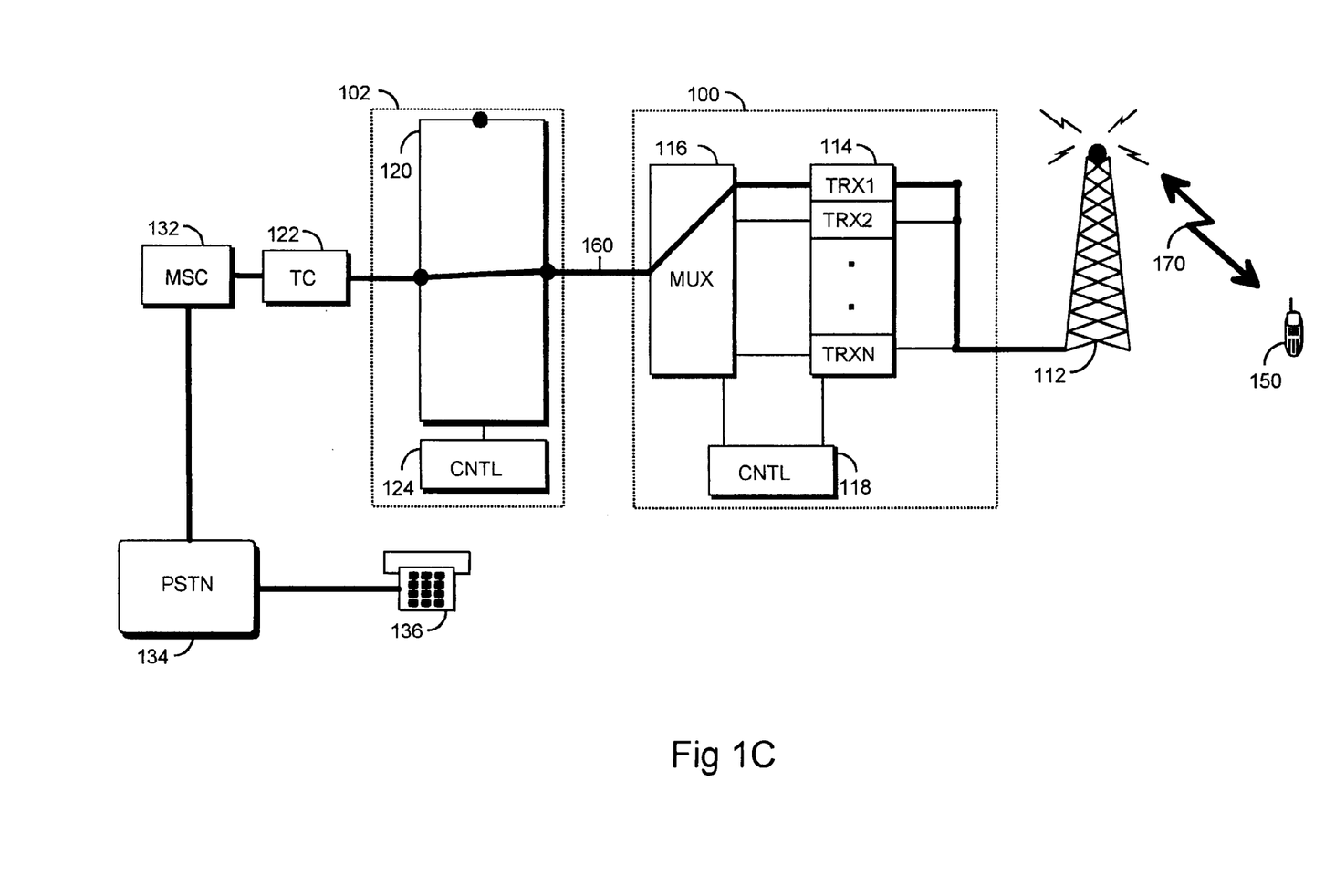
FIG. 1C shows a circuit-switched connection.

FIG. 1C shows how a circuit-switched transmission link is established between the user equipment 150 and the public switched telephone network terminal 136. In the figures, a thick line shows how data is transmitted through the system over an air interface 170 from the antenna 112 to the transceiver 114 and from there, after multiplexing in the multiplexer 116, over the transmission link 160 to the switching field 120 which has a connection to an output to the transcoder 122, and from there on, through a connection made in the mobile switching center 132 to the terminal 136 connected to the public switched telephone network 134. In the base station 100, the control unit 118 controls the multiplexer 116 in performing the transmission, and in the base station controller 102, the control unit 124 controls the switching field 120 to make a correct connection.

Figure 1D:
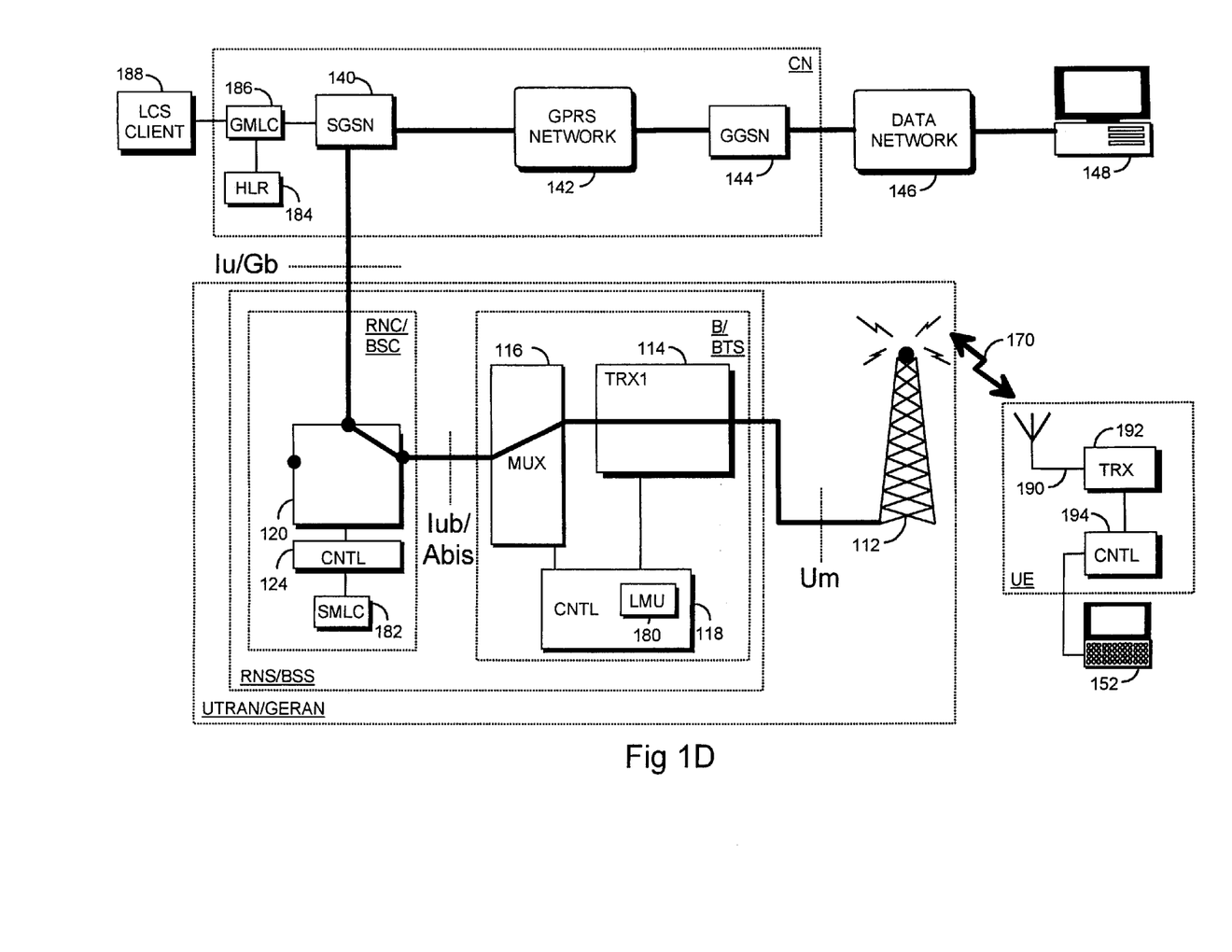
FIG. 1D shows a packet-switched connection.

FIG. 1D shows a packet-switched transmission link. A portable computer 152 is now connected to the user equipment 150. A thick line shows how the data being transmitted advances from the server 148 to the portable computer 152. Data can naturally also be transmitted in the opposite transmission direction, i.e. from the portable computer 152 to the server 148. The data advances through the system over the air interface, i.e. Um interface, 170, from the antenna 112 to the transceiver 114, and from there, after multiplexing in the multiplexer 116, over the transmission link 160 and Abis interface to the switching field 120, from which a connection has been established to an output to the support node 140 on the Gb interface, from the support node 140, the data is transmitted over the packet transmission network 142 through the gateway node 144 to the server 148 connected to the public packet transmission network 146.

For clarity's sake, FIGS. 1C and 1D do not show a case where both circuit-switched and packet-switched data is transmitted simultaneously. This is, however, completely possible and common, since free capacity can flexibly be taken into use from circuit-switched data transmission to packet-switched transmission. A network can also be built, in which only packet data is transmitted. In such a case, the structure of the network can be simplified.

Let us examine FIG. 1D again. The different entities of the UMTS system—CN, UTRAN/GERAN, RNS/BSS, RNC/BSC, B/BTS—are outlined in the figure by dashed-line boxes. The equipment for packet-switched transmission of the core network CN are now described in more detail. In addition to the support node 140, packet transmission network 142 and gateway node 144, the core network also contains a gateway mobile location center GMLC 186 and a home location register HLR 184. The task of the gateway mobile location center 186 is to provide the service in question to an external location service client 188. The home location register 184 contains subscriber information and routing information of the location service. In principle, the general architecture of a location service is a client/server architecture which comprises the location service client 188 and the server 186 providing the service.

In addition, of the apparatuses required by the location service, FIG. 1D shows a serving mobile location center SMLC 182 which can, as described, be a separate apparatus connected to the radio network controller RNC, or the serving mobile location center can also be in the radio network controller RNC, for instance in its control unit 124. The figure also shows a location measurement unit LMU 180 which can be either in the base station B, for instance in its control unit 118, or a separate apparatus connected to the base station B. The task of the location measurement unit 180 is to make radio measurements possibly required in the location method.

FIG. 1D also shows the structure of the user equipment UE with respect to the parts of interest to the present application. The user equipment UE comprises an antenna 190 through which a transceiver 192 receives signals from a radio path 170. The operation of the user equipment UE is controlled by a control unit 194 which is typically a microprocessor with the necessary software. Protocol processing described later is also performed with said software. In addition to the described parts, the user equipment UE comprises a user interface, which typically contains a loudspeaker, microphone, display and keyboard, and a battery. These are, however, not described in more detail herein, because they are not of interest to the present invention.

The structure of the transceiver in the base station B or the structure of the transceiver in the user equipment are not described in more detail herein, because it is clear to a person skilled in the art how said apparatuses are implemented. It is, for instance, possible to use a normal radio network transceiver and user equipment transceiver according to EGPRS. For the present application it is only important that the radio link 170 can be implemented, since the operation required by the application is then performed on the higher OSI (Open Systems Interconnection) model layers, especially on the third layer.

Figure 2:
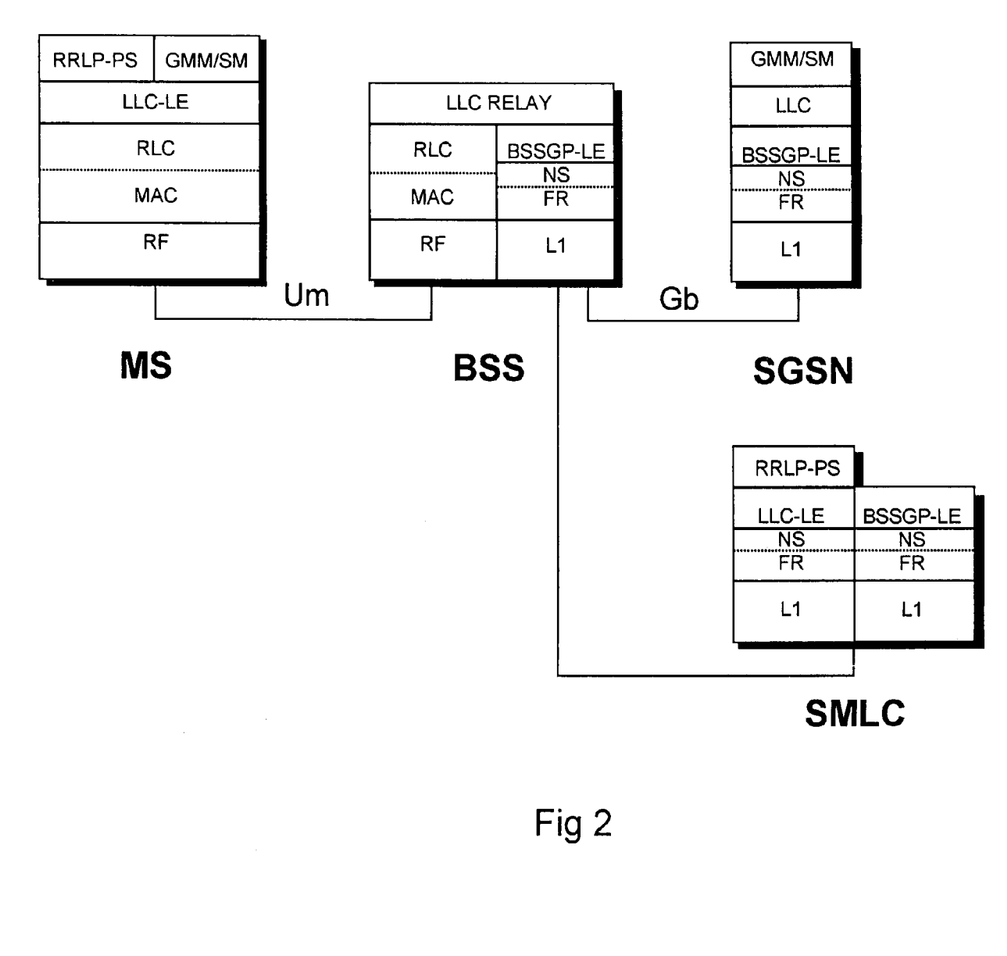
FIG. 2 shows an example of the protocol stacks in certain parts of the cellular network.

FIG. 2 shows packet protocol stacks of the EGPRS control plane. It should, however, be noted that the embodiments are not limited to EGPRS. The protocol stacks are formed according to the OSI model of ISO (International Standardization Organization). In the OSI model, the protocol stacks are divided into layers. In principle, there can be seven layers. FIG. 2 shows for each network element, which packet protocol parts are processed in the network element in question. The network elements are the mobile station MS, base station system BSS, support node SGSN and serving mobile location center SMLC. The base station and base station controller are not shown separately, because an interface has not been defined between them. The protocol processing set for the base station system BSS can thus in principle be distributed freely between the base station 100 and the base station controller 102, not however the transcoder 122 even though it does belong to the base station system BSS. The network elements MS, BSS and SGSN are separated by interfaces Um and Gb between them.

A layer in each apparatus MS, BSS, SGSN, SMLC communicates logically with a layer in another apparatus. Only the lowest, physical, layers communicate directly with each other. Other layers always use the services provided by the next lower layer. A message must thus physically advance vertically between the layers and only in the lowest layer does the message advance horizontally between the layers.

The actual bit-level data transmission is always done using the lowest first, i.e. physical, layer RF, L1. The physical layer defines-the mechanical, electronic and functional properties for connecting to the physical transmission path. The next, second layer, i.e. data link layer, uses the services of the physical layer for the purpose of implementing reliable data transmission by taking care of transmission error correction, for instance. On the air interface 170, the data link layer divides into an RLC/MAC (Radio Link Control Medium Access Control) sub-layer and an LLC (Logical Link Control) sublayer, i.e. a logical link control protocol. The third layer, i.e. network layer, provides the higher layers independence from data transmission and switching techniques which take care of the connections between the apparatuses. The network layer takes care of connection establishment, maintenance and release, for instance. In GSM, the network layer is also called a signaling layer. It has two main tasks: routing messages and enabling several independent connections simultaneously between two entities.

The network layer comprises a session management sub-layer SM and a GPRS mobility management sub-layer GMM.

The GPRS mobility management sub-layer GMM takes care of the consequences caused by the movement of the user of the mobile station that are not directly related to radio resource management. On the side of the public switched telephone network, this sub-layer would take care of verifying the user and connecting the user to the network. In a cellular network, this sub-layer supports user mobility, registration and management of data generated by mobility. In addition, this sub-layer checks the identity of the mobile station and the identities of the allowed services. Message transmission of this sub-layer takes place between the mobile station MS and the support node SGSN.

The session management sub-layer SM manages all functions related to packet-switched call management, but does not detect the movement of the user. The session management sub-layer SM establishes, maintains and releases connections. It has its own procedures for calls initiated by and terminating to the mobile station 150. The message transmission of this sub-layer, too, takes place between the mobile station MS and the support node SGSN.

In the base station system BSS, the messages of the session management sub-layer SM and GPRS mobility management sub-layer GMM are processed transparently, i.e. they are only transferred back and forth.

The logical link control protocol LLC establishes a reliable encrypted logical link between SGSN and MS. LLC is independent of the lower layers so that the changing of the air interface would affect the network part of the mobile network as little as possible. The services of the logical link control protocol include: a very reliable logical link between peer entities, support for variable-length information frames, support for both acknowledged and unacknowledged data transmission, each frame contains an unambiguous identifier of a transmitting or receiving mobile station, support for different service criteria, such as different priorities of data transmission, encryption of the transmitted data and user identity. LLC data is transmitted between the Um and Gb interfaces by a logical link control protocol relay LLC RELAY.

The MAC layer is responsible for the following tasks: multiplexing data and signaling on both uplink (mobile station to network part) and downlink (network part to mobile station) connections, management of uplink transmission path resource requests, and allocation and timing of downlink transmission path traffic resources. Traffic priorisation management also belongs to this layer. The RLC layer takes care of transmitting LLC-layer data, i.e. LLC frames, to the MAC layer; RLC chops the LLC frames into RLC data blocks and transmits them to the MAC layer. In the uplink direction, RLC builds LLC frames of the RLC data blocks and transmits them to the LLC layer. The physical layer is implemented in the Um interface by a radio link, for instance an air interface defined by GSM. Carrier modulation, interleaving and errorcorrection in the data to be transmitted, synchronization and transmitter power control are performed on the physical layer.

ABSSGP (Base Station Subsystem GPRS Protocol) layer transmits data of the higher layers and information related to routing and quality of service between BSS and SGSN. The FR (Frame Relay) layer performs the physical transmission of this information. NS (Network Service) transmits messages according to the BSSGP protocol.

So as to be able to implement the data transmission link between the mobile station MS and the serving mobile location center SMLC, there is a modified third-layer radio resource protocol RRLP-PS set on top of the packet protocol stack of the mobile station MS, and a modified logical link protocol LLC-LE is set on the second layer. The abbreviation PS refers to packet-switching and the abbreviation LE to a location extension required by the location service to the protocol. In a preferred embodiment, the radio resource protocol RRLP-PS is a modified radio resource location service protocol.

The data transmitted in the messages of the radio resource protocol RRLP-PS usually relates to one of the following location service messages: request to define the location of a mobile station, message to provide the location of a mobile station, message containing data assisting in location, acknowledgment of data assisting in location, and protocol error message. In addition, other kind of data can be transmitted as described between a mobile station MS and another functionality related to the serving mobile location center SMLC as required.

The modified logical link protocol LLC-LE provides at least the following functionality:
one or more logical link connections separated from each other by DLCI (Data Link Connection Identifier),
sequence control which maintains the order of frames in a logical link connection, detection of transmission errors, format errors and operational errors in a logical link connection, and recovery from said errors, sending a notification on errors from which recovery is not possible, flow control, encryption.

In a preferred embodiment, the logical link control protocol LLC-LE is similar to the logical link control protocol between a mobile station and a support node SGSN belonging to the core network of the radio system in a public packet radio service.

In addition, the radio network, i.e. base station system BSS in our example, comprises a second-layer logical link control relay LLC RELAY set in the packet protocol stack and having a modified functionality.

Further, the serving mobile location center SMLC comprises a third-layer modified radio resource protocol RRLP-PS set on top of the packet protocol stack and a modified logical link protocol LLC-LE set on the second layer.

Novelties in comparison with prior art are preferably implemented by software, in which case relatively simple software changes are required to exactly limited functions in the radio network and user equipment. The user equipment UE comprises means 194 for implementing the functionality defined by the packet protocol stack. Similarly, the radio network, i.e. base station system BSS in our example, for instance its base station controller, comprises means 124 for implementing the functionality defined by the packet protocol stack. The radio network BSS also comprises means 182 for processing the packet protocol stack in the serving mobile location center. Said means can be implemented for instance by a software executed in a general-purpose processor, in which case the different protocols of the protocol stacks are software components implementing the required functionality. A hardware implementation is also possible, for instance by ASIC (Application Specific Integrated Circuit) or as a control logic made up of separate components.

In a preferred embodiment, the logic link control protocol LLC-LE comprises means for setting its own service access point identifier (SAPI) to a radio resource protocol message in a logical link protocol frame. This makes it easier to distinguish different types of messages from each other, especially in the logical link control protocol relay LLC RELAY.

In a preferred embodiment, the logical link control protocol LLC-LE comprises means for using a separate address space for the logical link control protocol frames which contain a radio resource protocol message. This makes the processing of the frames more efficient.

In a preferred embodiment, the logical link control protocol relay LLC RELAY comprises means for examining the service access point identifier of the logical link control protocol message received from a mobile station MS and for routing said message to the serving mobile location center SMLC if the service access point identifier is that of a radio resource protocol.

Even though the example in FIG. 2 only shows one mobile station MS, the logical link control protocol LLC-LE in the serving mobile location center SMLC comprises means for supporting more than one simultaneous radio resource protocol entities residing in different user equipment UE, and thus also more than one third-layer entities.

Defining the location of user equipment refers to finding out the geographical location of the user equipment and giving it in longitudes and latitudes. Either the user equipment, ie. its user, or an external location service client to the radio system may be interested in the location. The route traveled by the user equipment is tracked in such a manner that the user equipment transmits to the core network at regular intervals a request message which requests the definition of the location of the user equipment. FIG. 2 also shows how the traffic between the serving mobile location center SMLC and the support node SGSN can be implemented. This traffic is required for instance for the transmission of the location service requests received from the client 188 from the gateway location center 186 to the serving mobile location center 140. The packet protocol stack of the serving mobile location center SMLC on the right shows the protocols required by the traffic. Thus a modified BSSGP layer, i.e. BSSGP-LE is required, and a corresponding BSSGP-LE also in the support node SGSN.

The data assisting in location refers for instance to the assisting message described earlier which contains information for a more efficient use of the GPS system. Such assisting messages can be transmitted on the broadcast channel of the system, and their use is chargeable. Therefore, said assisting message may be encrypted, and user equipment must request from the network the encryption key to decrypt said encryption.

Figure 3:
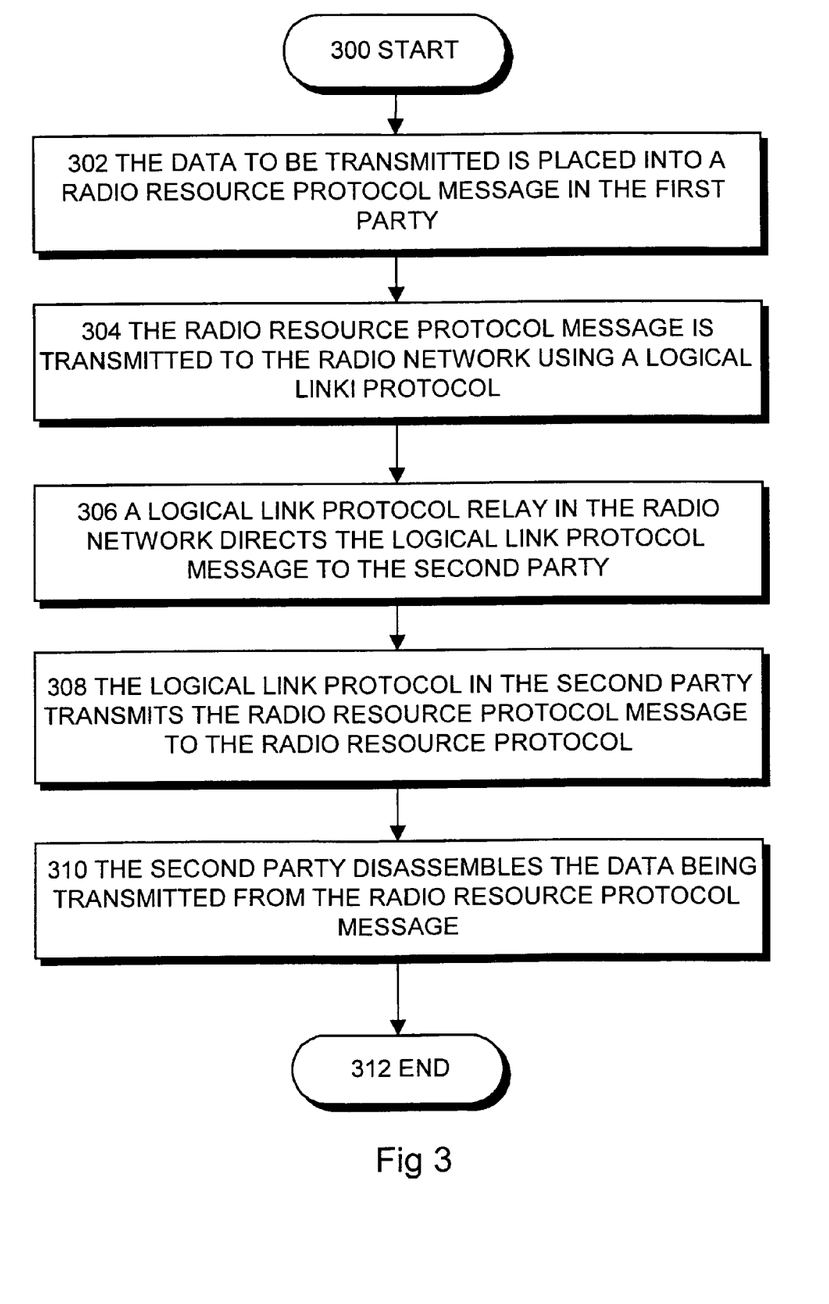
FIG. 3 is a flow chart illustrating a method for transmitting data in a packet-switched radio system implementing a user equipment location service.

With reference to FIG. 3, the following describes the steps taken in the method for transmitting data in a packet-switched radio system implementing a user equipment location service. The data is transmitted using a data transmission link between user equipment UE of the radio system and a location center 182 in the radio network GERAN of the radio system. Data can be transmitted in both transmission directions, i.e. from the user equipment UE to the serving mobile location center 182 and from the serving mobile location center 182 to the user equipment UE. The example of FIG. 3 shows a general case in which the parties of the data transmission link are called a first and a second party. The first party can thus be the user equipment UE or location center 182 and correspondingly, the second party can be the location center 182 or the user equipment UE.

The execution of the method is started in block 300. In block 302, the data to be transmitted is placed in a message of the third-layer radio resource protocol RRLP-PS set on top of the packet protocol stack residing in the first party of the data transmission link.

In block 304, the radio resource protocol message is transmitted to the radio network GERAN using the logical link control protocol LLC-LE set on the second layer of the packet protocol stack.

In block 306, the logical link control protocol relay LLC RELAY set on the second layer of the packet protocol stack in the radio network GERAN directs the logical link protocol message to the second party of the data transmission link.

In block 308, the second-layer logical link control protocol LLC-LE residing in the second party of the data transmission link and set on the packet protocol stack transmits the radio resource protocol message to the radio resource protocol RRLP-PS set on the third layer.

In block 310, the second party of the data transmission link disassembles the transmitted data from the radio resource protocol message.

As can be seen from the attached claims, the method can be modified using the preferred embodiments of the radio system described above.

Even though the invention has been explained in the above with reference to examples in accordance with the accompanying drawings, it is obvious that the invention is not restricted to them but can be modified in many ways within the scope of the inventive idea disclosed in the attached claims.

The invention claimed is:

1. A method for transmitting data in a packet-switched radio system implementing a user equipment location service, wherein the data is transmitted using a data transmission link between user equipment of the radio system and a serving mobile location center of a radio network of the radio system, the user equipment and the serving mobile location center constituting first and second parties of the data transmission link, and in the method
   the data to be transmitted is placed in a message of a third-layer radio resource protocol set on top of a packet protocol stack residing in the first party of the data transmission link,
   the radio resource protocol message is transmitted to the radio network using a logical link control protocol set on the second layer of the packet protocol stack,
   a logical link control protocol relay set on the second layer of the packet protocol stack in the radio network directs the logical link protocol message to the second party of the data transmission link,
   the second-layer logical link control protocol residing in the second party of the data transmission link and set on the packet protocol stack transmits the radio resource protocol message to the radio resource protocol set on the third layer, and
   the second party of the data transmission link disassembles the transmitted data from the radio resource protocol message.

2. A method as claimed in claim 1, in which the radio resource protocol is a radio resource location service protocol.

3. A method as claimed in claim 1, in which the logical link control protocol provides control protocol between a mobile station and a support node belonging to the core network of the radio system in a public packet radio service.

4. A method as claimed in claim 1, in which the frame of a logical link control protocol comprises its own service access point identifier for the radio resource protocol.

5. A method as claimed in claim 4, in which separate address space is used for the logical link control protocol frames which contain a radio resource protocol message.

6. A method as claimed in claim 4, in which the logical link control protocol relay examines the service access point identifier of the logical link control protocol message received from a mobile station and routes said message to the serving mobile location center if the service access point identifier is that of the radio resource protocol.

7. A method as claimed in claim 1, in which the data to be transmitted is encrypted in the logical link control protocol.

8. A method as claimed in claim 1, in which the logical link control protocol in the serving mobile location center supports more than one simultaneous radio resource protocol entities residing in different user equipment.

9. A method as claimed in claim 1, in which the data to be transmitted relates to one of the following location service messages: request to define the location of a mobile station, message to provide the location of a mobile station, message containing data assisting in location, acknowledgement of data assisting in location, and protocol error message.

10. A packet-switched radio system implementing a user equipment location service, comprising
    a network part of the radio system, which comprises a core network and a radio network having a data transmission link to the core network,
    and a radio link from the radio network to user equipment,
    the radio network comprising a serving mobile location center for locating the user equipment,
    the user equipment comprising a third-layer radio resource protocol set on a packet protocol stack and a logical link control protocol set on a second layer,
    the radio network comprising a second-layer logical link control relay set on the packet protocol stack,
    the serving mobile location center comprising a third-layer radio resource protocol set on the packet protocol stack and a logical link control protocol set on the second layer.

11. A radio system as claimed in claim 10, in which the radio resource protocol is a radio resource location service protocol.

12. A radio system as claimed in claim 10, in which the logical link control protocol provides control protocol between a mobile station and a support node belonging to the core network of the radio system in a public packet radio service.

13. A radio system as claimed in claim 10, in which the logical link control protocol comprises means for setting its own service access point identifier to a radio resource protocol message in a logical link protocol frame.

14. A radio system as claimed in claim 13, in which the logical link control protocol comprises means for using a separate address space for the logical link control protocol frames which contain a radio resource protocol message.

15. A radio system as claimed in claim 13, in which the logical link control protocol relay comprises means for examining the service access point identifier of the logical link control protocol message received from a mobile station and for routing said message to the serving mobile location center if the service access point identifier is that of the radio resource protocol.

16. A radio system as claimed in claim 10, in which the logical link control protocol comprises means for encrypting the data to be transmitted.

17. A radio system as claimed in claim 10, in which the logical link control protocol residing in the location center comprises means for supporting more than one simultaneous radio resource protocol entities residing in different user equipment.

18. A radio system as claimed in claim 10, in which the data to be transmitted relates to one of the following location service messages: request to define the location of a mobile station, message to provide the location of a mobile station, message containing data assisting in location, acknowledgement of data assisting in location, and protocol error message.

* * * * *